United States Patent [19]

Baum

[11] 4,239,190
[45] Dec. 16, 1980

[54] STRUCTURE FOR COLLECTING EXHAUST GASES FROM A CONVERTER

[75] Inventor: Jörg P. Baum, Essen, Fed. Rep. of Germany

[73] Assignee: Verfahrenstechnik Dr. Ing. Kurt Baum, Essen, Fed. Rep. of Germany

[21] Appl. No.: 35,212

[22] Filed: May 2, 1979

[30] Foreign Application Priority Data

May 16, 1978 [DE] Fed. Rep. of Germany ....... 2821379

[51] Int. Cl.$^3$ ............................................. C21C 5/38
[52] U.S. Cl. ................................ 266/158; 98/115 R; 266/245
[58] Field of Search .................. 75/59, 60; 266/144, 266/156, 158, 159, 217, 225, 226, 271, 272, 273, 243–248; 98/115 R, 115 VM

[56] References Cited

U.S. PATENT DOCUMENTS

| | | | |
|---|---|---|---|
| 2,855,194 | 10/1958 | König | 75/60 |
| 2,954,244 | 9/1960 | Austin | 266/158 |
| 3,177,065 | 4/1965 | Okaniwa et al. | 266/158 |
| 3,796,421 | 3/1974 | Knuppel et al. | 266/158 |
| 3,854,932 | 12/1974 | Bishop, Jr. | 75/60 |
| 4,026,698 | 5/1977 | Koump | 75/59 |
| 4,123,043 | 10/1978 | Nomine et al. | 266/158 |

FOREIGN PATENT DOCUMENTS

| | | | |
|---|---|---|---|
| 1408153 | 2/1969 | Fed. Rep. of Germany | 266/158 |
| 596806 | 3/1978 | U.S.S.R. | 266/158 |

Primary Examiner—L. Dewayne Rutledge
Assistant Examiner—Michael L. Lewis
Attorney, Agent, or Firm—Toren, McGeady and Stanger

[57] ABSTRACT

A hood-like chamber over a converter vessel for refining pig iron, affords the collection of exhaust gases from the vessel and the direction of the gases into an exhaust gas line. The chamber is formed by a top wall containing an opening into the exhaust gas line, and side walls extend downwardly from the top wall. The lower ends of the side walls are located above the bottom of the vessel. A flange extends inwardly from the lower end of the side walls into contact with a collar extending radially outwardly from a support ring encircling the vessel. A seal can be provided between the flange and the collar to prevent the passage of air between them into the chamber. Alternatively, a gap can be left between the flange and the collar to admit a certain amount of secondary air into the chamber.

8 Claims, 2 Drawing Figures

STRUCTURE FOR COLLECTING EXHAUST GASES FROM A CONVERTER

SUMMARY OF THE INVENTION

The present invention is directed to a structure for collecting exhaust gases from a converter and includes a hood-like chamber arranged over the converter and the chamber is connected to an exhaust gas line.

When pig iron is refined to steel, large quantities of dust bearing hot exhaust gases are generated in the converter independent of the refining method employed. For reasons of environmental protection and to utilize the heat content, the exhaust gases must be collected to convey them to a waste heat boiler, to a gas purification device and, possibly, to a combustion device.

In the simplest arrangement, the hot exhaust gases from a converter are collected by an exhaust hood as disclosed in German Pat. No. 2,338,339. The exhaust hood is connected by a collar to a platform which surrounds and is spaced from the converter mouth or opening. Due to the suction action within the exhaust hood, large quantities of fresh air flow into the hood through the gap between the converter mouth and the platform. In the exhaust hood, the fresh air leads not only to after burning of the carbon monoxide contained in the exhaust gases, but also significantly increases the amount of the exhaust gases. As a result, the exhaust gas line and associated equipment must be of a sufficient size to handle the increased flow.

The conditions resulting from the arrangement disclosed in German Offenlegungsschrift No. 2,648,790 are not significantly different. In this arrangement, a converter is provided with doors, an exhaust line, and a portal exhaust hood in front of the door opening. The doors must be opened during charging, slag removal and discharging. In addition, the space under the exhaust hood is open around its lower portion and allows large amounts of fresh air to be drawn into the hood. The exhaust system is required to handle this fresh air in addition to the exhaust gases from the converter.

To reduce the fresh air drawn into the exhaust hood as much as possible, the German Auslegeschrift No. 2,233,448 suggests a converter completely enclosed within a chamber which is connected to an exhaust system. In this arrangement, the size of the chamber must be sufficient so that all operations including charging, slag removal and discharging of the converter can be carried out within the chamber. To assure that all such operations can be effected, the chamber has a charging door and, in its lower portion, openings which are closed by doors through which a slag ladle or cap ladle can be moved into the chamber. Further, the chamber contains the bearings for the converter pivots, at least a portion of the drive for tilting the converter, means for supplying fresh air, and additional units needed in the immediate vicinity of the converter for carrying out its operation.

Finally, to keep the volume of the converter as small as possible, it has also been suggested to provide a pressure container which relatively closely surrounds the converter with a removable bottom so that an appropriate ladle can be moved under the converter after the bottom has been removed for effecting slag removal and tapping. The removable bottom, however, creates problems in sealing and further requires lifting and moving equipment for handling the great weights involved.

Therefore, the primary object of the present invention is to provide a structure for collecting the exhaust gases which is especially compact and does not require any additional devices for slag removal, tapping and maintenance.

In accordance with the present invention, the converter is enclosed by a hood-like chamber with the lower end of the chamber contacting the converter preferably above the lower end of the chamber. As a result, the chamber provides a space around the converter for collecting gas and directing it to the exhaust system. By providing appropriate seals between the chamber structure and the converter it is possible to suction off the exhaust gases without drawing in any secondary air. It is possible, however, to provide an annular space between the cooperating parts of the converter and the chamber structure so that a defined supply of air can be afforded into the chamber. It is also possible, instead of using an annular gap, to provide closable air supply openings into the lower region of the chamber. Furthermore, for the removal of the exhaust gases, the seal between the lower end of the chamber structure and the converter can be constructed so that the interior of the chamber is completely pressure-tight and the exhaust gases are discharged and treated by means of the excess pressure of the refining gas.

Compared to previously known chamber structures, the volume of the chamber is extremely small because it does not completely surround the converter, rather it extends downwardly only to a point slightly below the converter pivots. Accordingly, the portion of the converter located below the pivots is freely accessible and does not differ from completely detached converters. Accordingly, it is possible to supervise continuously the nozzles and the lime distributor of a flow-through oxygen converter.

It is particularly advantageous when the lower ends of the side walls of the chamber contact the support ring of the converter, since it is possible to provide an advantageous gas-tight connection. The converter or its support ring may have a collar which, in turn, bears against an inwardly direct flange on the lower ends of the chamber side walls. Accordingly, it is simple to provide a seal for such an arrangement or to afford a clearance or annular gap between the converter and the chamber structure. Moreover, an annular apron can extend downwardly from the lower ends of the chamber side walls with the apron concentrically enclosing the lower end of the converter. A suction line can be provided through the apron so that gases can be drawn off which escape downwardly from the chamber through the annular gap or about the lower portion of the converter vessel.

The contacting surfaces between the chamber structure and the converter or between the converter collar and the inwardly directed flange on the lower ends of the chamber structure can be sealed in a conventional manner to prevent, as far as it is possible, secondary air from entering the chamber or exhaust gases from escaping downwardly from the chamber. A special sealing arrangement is necessary when the exhaust gases are discharged by means of the excess pressure of the refining gases.

The bottom of the chamber is open so that the converter vessel can be tilted during charging, slag removal and discharging. In the upright or refining position of the converter vessel, the opening from the chamber is closed by the cooperating parts of the converter and the chamber structure. As mentioned, an annular gap may be provided between the cooperating parts permitting a certain amount of secondary air to be drawn into the chamber for the partial combustion of the exhaust gases from the converter due to the negative pressure of −0.1 to −25 mm water column existing in the chamber. Since the exhaust gases are sometimes generated in batches during the refining operation, it happens that the amount of the exhaust gases exceeds the capacity of the exhaust system. Accordingly, the space within the chamber is dimensioned so that it is capable of storing for a short period of time an amount of gas which is 50% above the nominal throughput of the exhaust system. If, in such a case, any exhaust gas escapes through the seal between the cooperating parts of the converter and the chamber structure, or through an annular gap therebetween, such gas can be suctioned off by the line which opens through the apron at the lower end of the structure.

Moreover, drawing in air through the annular gap compensates for irregular exhaust gas generation during the refining operation. Whether and to what extent this is the case, depends on the process control. Instead of the annular gap, however, openings for fresh air can be provided in the chamber structure or in the cooperating parts of the converter and the chamber structure, for example in the collar extending around the converter. Preferably such openings have controllable cross sections.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
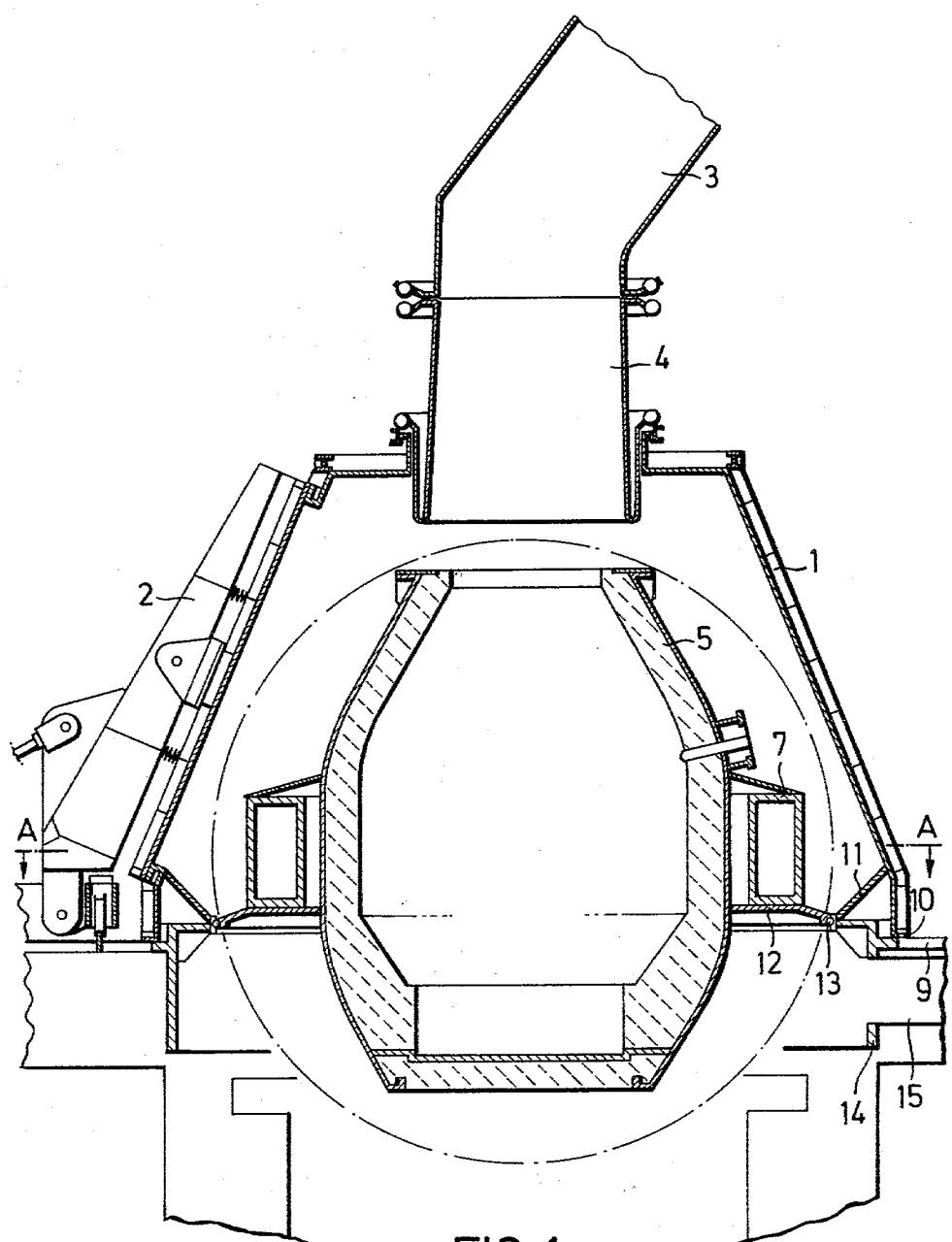
FIG. 1 is a vertical sectional view through a converter enclosed within a chamber structure embodying the present invention.

As shown in FIG. 1, a conventional converter vessel 5 is partially enclosed by a chamber structure or housing 1. The chamber structure 1 includes a charging door 2 and a duct section 4 for connection in a gas-tight manner to an exhaust gas line 3. As illustrated, the converter vessel 5 is in its normal upright position, and its opening or mouth is located below and aligned with the duct section 4. The chamber structure 1 includes a top wall incorporating the duct section 4 and side walls extending downwardly from the top wall to a location located at the lower end of a support ring 7 for the converter vessel 5 or to the converter platform 9.

Figure 2:
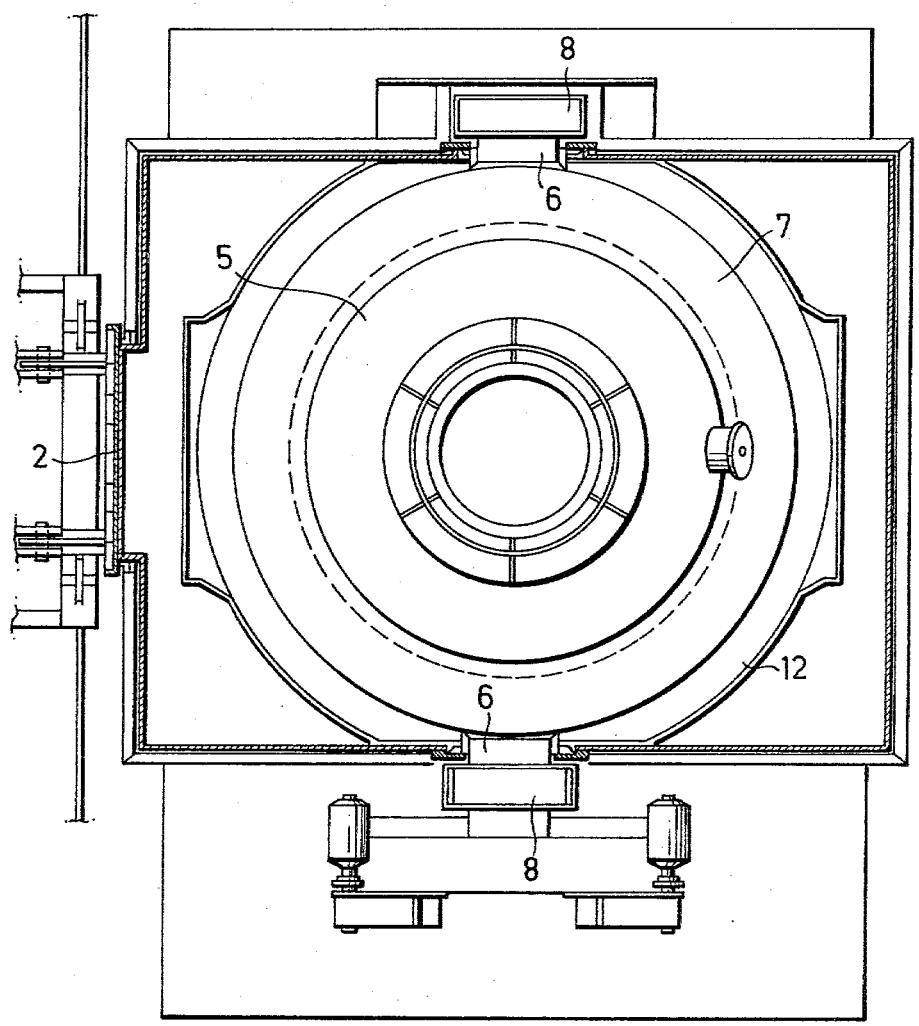
FIG. 2 is a top view of the structure shown in FIG. 1.

The converter vessel 5 can be pivoted or tilted from the upright position shown in FIG. 1 to other positions for charging, slag removal or discharging. As shown in FIG. 2, pivots 6, located on diametrically opposite sides of the converter vessel 5, are positioned on and extend outwardly from a support ring 7. Support ring 7 encircles the converter vessel 5 approximately midway between its upper and lower ends. The pivots 6 are supported in bearing blocks 8 mounted on converter platform 9.

The lower end 10 of the chamber structure 1 is located approximately in the same plane as the lower end of the support ring 7 or of the converter platform 9. As a result, the chamber structure 1 only encloses approximately two-thirds of the converter with the remaining lower third extending below the lower end 10.

Extending inwardly from the lower end 10 of the chamber structure 1 is an internal flange 11 and its radially inner end or edge is located opposite the radially outer edge of a collar 12 which encircles the converter vessel 5 and is fastened to the converter vessel and to the lower part of the support ring 7. In the embodiment illustrated, a seal 13 is positioned between the juxtaposed edges of the internal flange 11 and the collar 12. Alternatively, an annular gap could be provided between these two structures so that secondary air can be drawn into the chamber from below. An annular apron 14 encircles and is located outwardly from the lower end of the converter vessel. Annular apron 14 extends downwardly from the internal flange 11 at the lower end of the chamber structure 1. A suction line 15 is connected through the apron 14 to the space around the converter vessel and below the cooperating internal flange 11 and collar 12. The suction line 15 can be connected to the exhaust gas line 3.

During charging, the converter vessel 5 is tilted into an oblique position toward the left, as viewed in the drawings. Similarly, during slag removal, the converter is also tilted to the left, however, when the converter vessel is being discharged it is tilted to the right into a horizontal position. Such tilting or pivoting movements of the converter vessel, from the normally upright position shown in FIG. 1, can be effected without difficulty, since the internal diameter of the flange 11, extending inwardly from the lower ends 10 of the side walls of the chamber structure 1, has a diameter corresponding to the largest dimension of the converter vessel measured from the midpoint of the axis through the pivots to the most remote point therefrom on the exterior of the vessel. As a result, the converter vessel can be tilted or pivoted in the opening formed by the internal flange 11 so that, in accordance with the invention, slag removal and discharging are not performed in the interior of the chamber, but rather in the manner of completely detached converters. Accordingly, the present invention affords a simple arrangement for collecting exhaust gases from the converter without any leakage, and with or without the supply of secondary air to the interior of the chamber.

While specific embodiments of the invention have been shown and described in detail to illustrate the application of the inventive principles, it will be understood that the invention may be embodied otherwise without departing from such principles.

What is claimed is:

1. A structure including a converter for refining pig iron into steel, said converter includes a vessel normally arranged in an upwardly extending position and having a normally upwardly extending axis, an upper end and a lower end each extending transversely of the axis and the upper end forming an opening, and means for collecting exhaust gases from said converter vessel, said means comprises walls forming a hood-like chamber, said walls comprise a top wall spaced above the opening in the upper end of said converter vessel in the upwardly extending position thereof, said top wall having an opening therein for connection to an exhaust gas line, and side walls extending downwardly from said top wall and spaced outwardly from and extending around said converter vessel, wherein the improvement comprises that said side walls have lower ends located between the upper and lower ends of said converter vessel, said converter includes a support ring secured to said vessel and located outside of and encircling said vessel between the upper and lower ends thereof and said support ring extending substantially normally of the upwardly extending axis of said vessel, and a collar encircling said vessel and attached to said vessel and said support ring, said collar extending substantially normally of the upwardly extending axis of said vessel and projecting radially outwardly from said support ring toward the lower ends of said side walls to bear into a juxtaposed relationship, means for pivotally mounting said support ring within said hood-like chamber about a pivot axis extending transversely of the normally upwardly extending axis of said vessel so that said support ring along with said collar and said vessel can be pivoted about the pivot axis relative to said means forming said hood-like chamber, and the maximum dimension of said support ring, collar and vessel from said pivot axis being such that said support ring, collar and vessel pivot on a turning circle not greater than the inside diameter of the lower ends of said side walls encircling said support ring and collar, said support ring being located between and spaced from the upper and lower ends of said vessel and the lower ends of said side walls extending downwardly at least to the region of said support ring with said lower ends laterally enclosing said vessel above the lower end of said vessel so that the lower end of said vessel is located below and is accessible from the exterior of said side walls.

2. A structure, as set forth in claim 1, wherein said side walls include an internal flange connected to and extending inwardly at the lower ends of said side walls toward and spaced outwardly from said converter vessel, the radially inner edge of said internal flange bearing against the radially outer edge of said collar.

3. A structure, as set forth in claim 1, wherein said side walls include an internal flange connected to and extending inwardly from the lower ends of said side walls toward and spaced outwardly from said converter vessel, the radially inner edge of said internal flange being juxtaposed to the radially outer edge of said collar, and a seal member positioned between the radially outer edge of said collar and the radially inner edge of said internal flange and forming a seal for the lower end of the hood-like chamber when said vessel is arranged in the upwardly extending position.

4. A structure, as set forth in claim 1, wherein said side walls include an internal flange connected to and extending inwardly from the lower ends of said side walls toward and spaced outwardly from said converter vessel, the radially inner edge of said internal flange being spaced closely outwardly from the radially outer edge of said collar and forming therebetween an annular gap communicating with the interior of said hood-like chamber.

5. A structure, as set forth in claim 1, wherein said side walls have closable openings therethrough for admitting a flow of secondary air into the hood-like chamber.

6. A structure, as set forth in claim 5, including means for controlling the flow of secondary air through said closable openings in said side walls.

7. A structure, as set forth in claim 1, wherein an annular apron is connected to and extends downwardly from the lower ends of said side walls, and said annular apron extending around and spaced outwardly from the lower end of said converter vessel below said support ring.

8. A structure, as set forth in claim 7, wherein a suction line is connected to said annular apron and opens into the space between said annular apron and the lower end of said converter vessel below said hood-like chamber.

* * * * *